(12) United States Patent
Senci et al.

(10) Patent No.: US 10,504,122 B2
(45) Date of Patent: Dec. 10, 2019

(54) SYSTEMS AND METHODS FOR PREDICTING CHARGEBACKS

(71) Applicant: MasterCard International Incorporated, Purchase, NY (US)

(72) Inventors: David J. Senci, Troy, IL (US); Michael J. Pope, Florissant, MO (US); Peng Yang, Chesterfield, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 552 days.

(21) Appl. No.: 14/973,232

(22) Filed: Dec. 17, 2015

(65) Prior Publication Data

US 2017/0178134 A1    Jun. 22, 2017

(51) Int. Cl.
*G06Q 20/40* (2012.01)
*G06Q 40/02* (2012.01)

(52) U.S. Cl.
CPC ......... *G06Q 20/407* (2013.01); *G06Q 20/405* (2013.01); *G06Q 20/4016* (2013.01); *G06Q 40/02* (2013.01)

(58) Field of Classification Search
CPC .................. G06Q 20/4016; G06Q 20/407
See application file for complete search history.

(56) References Cited

U.S. PATENT DOCUMENTS

| | | |
|---|---|---|
| 5,819,226 A | 10/1998 | Gopinathan et al. |
| 6,108,642 A | 8/2000 | Findley |
| 6,516,056 B1 | 2/2003 | Justice et al. |

(Continued)

OTHER PUBLICATIONS

Khormuji, Morteza Kolali et al., Credit Card Fraud Detection with a Cascade Artificial Neural Network and Imperialist Competitive Algorithm, International Journal of Computer Applications, 96.25 Foundation of Computer Science, Jun. 23, 2014. (Year: 2014).*

(Continued)

*Primary Examiner* — Eric T Wong
(74) *Attorney, Agent, or Firm* — Armstrong Teasdale LLP

(57) ABSTRACT

A chargeback processing computing device is provided. The chargeback processing computing device may include a chargeback prediction module configured to extract transaction information about a plurality of transactions authorized using an account, an account profile information module configured to extract account profile information, the account profile information comprising historical chargeback information about the plurality of transactions authorized using the account, a model generating module configured to generate a chargeback prediction model for the account based on the extracted transaction information and the account profile information, a receiver configured to receive a candidate transaction paid for using the account, wherein the chargeback prediction module is configured to extract transaction information from the candidate transaction, and a processor configured to generate a chargeback prediction score indicating a likelihood that the candidate transaction will result in a chargeback based on the extracted transaction clearing information and the generated chargeback prediction model.

18 Claims, 4 Drawing Sheets

(56) References Cited

U.S. PATENT DOCUMENTS

| | | | |
|---|---|---|---|
| 6,783,065 B2* | 8/2004 | Spitz | G06Q 20/10 235/376 |
| 7,251,624 B1 | 7/2007 | Lee et al. | |
| 8,600,873 B2 | 12/2013 | Fisher | |
| 8,620,798 B2 | 12/2013 | Faith et al. | |
| 2002/0095360 A1* | 7/2002 | Joao | G06Q 20/04 705/30 |
| 2002/0139837 A1* | 10/2002 | Spitz | G06Q 20/10 235/375 |
| 2010/0114774 A1 | 5/2010 | Linaman et al. | |
| 2011/0196791 A1* | 8/2011 | Dominguez | G06Q 20/40 705/44 |
| 2011/0238575 A1* | 9/2011 | Nightengale | G06Q 20/20 705/44 |
| 2014/0012738 A1* | 1/2014 | Woo | G06Q 30/06 705/39 |
| 2014/0095393 A1 | 4/2014 | Nightengale et al. | |
| 2015/0012430 A1 | 1/2015 | Chisholm et al. | |
| 2015/0178638 A1* | 6/2015 | Deshpande | G06N 3/084 706/12 |
| 2016/0042353 A1* | 2/2016 | Canis | G06Q 20/4016 705/44 |

OTHER PUBLICATIONS

"Card Fraud Significantly Higher in Internet Commerce Transactions", Card News 15.16: NA. Access Intelligence, LLC, Aug. 9, 2000. (Year: 2000).*

PCT International Search Report and Written Opinion, Application No. PCT/US2016/062706, dated Feb. 3, 2017, 11 pps.

\* cited by examiner

SYSTEMS AND METHODS FOR PREDICTING CHARGEBACKS

BACKGROUND

The present application relates generally to payment account networks and, more particularly, to network-based systems and methods for predicting the likelihood of a payment transaction resulting in a chargeback.

When a user of an account, such as an account associated with a payment card such as a credit card or a debit card, authorizes a transaction to purchase goods or services from a merchant using the account, an acquiring bank (i.e., the merchant bank) reimburses the merchant for the transaction. The acquiring bank then settles those funds with an issuing bank (issuer) of the account corresponding to the payment card or with a third-party processor authorized to act on behalf of the issuing bank by presenting the transaction into a transaction payment network. In a process known as clearing, transaction data is moved from the acquiring bank to the payment network, and from the payment network to the issuing bank. After clearing, settlement of the final payment occurs. Settlement is a process used to exchange funds between the acquiring bank and the issuing bank (or third party processor) for the net value of a batch of all monetary transactions that have cleared for that processing day.

On occasion, the consumer may be unsatisfied with the goods or services provided by the merchant, may not recognize the purchase, may determine the purchase is fraudulent, or may otherwise dispute the transaction. In these examples, the consumer may return the goods and/or request a chargeback from the issuing bank. The chargeback may be used to return the funds to the account corresponding to the payment card. Generally, the issuing bank immediately issues a credit to the account for the amount of the transaction. The issuing bank then sends a chargeback request to an issuer processor, and the request is collected with other requests and submitted in a batch to the payment network. Each time a user of the account informs the issuing bank of a potential chargeback, the issuing bank must pay a fee to get the process started to determine which party will be left with the cost of the purchase of the item or services. Depending on the outcome, the account in question, the issuing bank, the acquiring bank, or the merchant may be left with the cost of the transaction.

The threat of the reversal of funds often forces merchants to provide quality products, helpful customer service, and timely refunds, among other things. However, a merchant may likewise dispute the chargeback with the assistance of the merchant's acquiring bank. The issuing bank and the acquiring bank may then attempt to mediate the charge through a dispute process. The result is that the chargeback process uses valuable banking resources and causes additional processing time in order to resolve the chargeback request. Furthermore, if the issuing bank and the acquiring bank cannot come to an agreement on the chargeback, the payment processor may have to step in and make a final decision, thus using additional valuable resources.

Therefore, in an effort to conserve time and resources, it may be beneficial for a bank to deny a valid transaction or a potentially invalid transaction when it is determined that such a transaction will likely become a chargeback. It may also be beneficial for a bank to know how many potential chargeback requests are potentially out there in the waiting.

BRIEF DESCRIPTION OF THE DISCLOSURE

In one aspect, a chargeback processing computing device in communication with a payment processor for determining a likelihood of a chargeback is provided. The chargeback processing computing device may include (i) a chargeback prediction module configured to extract transaction information about a plurality of transactions charged to or authorized using an account, (ii) an account profile information module configured to extract account profile information about the account used to authorize the plurality of transactions, the account profile information may include historical chargeback information about the plurality of transactions authorized using the account, (iii) a model generating module configured to generate a chargeback prediction model for the account based on the extracted transaction information and the account profile information, (iv) a receiver configured to receive a candidate transaction paid for by the account, wherein the chargeback prediction module is further configured to extract transaction information from the candidate transaction, and (v) a processor configured to generate a chargeback prediction score indicating a likelihood that the candidate transaction will result in a chargeback based on the extracted transaction information for the candidate transaction and the generated chargeback prediction model.

In another aspect, a computer-implemented method for determining the likelihood of a transaction resulting in a chargeback using a computing device coupled to a payment processing device is provided. The method includes extracting transaction information about a plurality of transactions authorized using an account, extracting account profile information about the account used to authorize the plurality of transactions, wherein the account profile information includes historical chargeback information about the plurality of transactions authorized using the account, generating a chargeback prediction model for the account based on the extracted transaction information and the account profile information, receiving a candidate transaction paid for using the account and extracting transaction information from the candidate transaction, and generating a chargeback prediction score indicating a likelihood that the candidate transaction will result in a chargeback based on the extracted transaction information for the candidate transaction and the generated chargeback prediction model.

In another aspect, one or more computer-readable storage media having computer-executable instructions embodied thereon for determining the likelihood of a transaction resulting in a chargeback are provided. The computing device includes a memory device and a processor in communication with the memory device. When executed by the processor, the computer-executable instructions cause the processor to extract transaction information about a plurality of transactions authorized using an account, extract account profile information about the account used to authorize the plurality of transactions, wherein the account profile information may include historical chargeback information about the plurality of transactions authorized using the account, generate a chargeback prediction model for the account based on the extracted transaction information and the account profile information, receive a candidate transaction paid for using the account, and extracting transaction information from the candidate transaction, and generate a chargeback prediction score indicating a likelihood that the candidate transaction will result in a chargeback based on the extracted transaction information for the candidate transaction and the generated chargeback prediction model.

DETAILED DESCRIPTION OF THE DISCLOSURE

When a transaction occurs such as a transaction associated with a debit card or a credit card (i.e., an account having a primary account number (PAN) associated therewith), a user of the account has a period of time during which they can dispute the charge, for example, 120 to 180 days. When a cardholder is successful in disputing a charge with their issuing bank, the dispute is considered a successful chargeback for the cardholder. A chargeback occurs when the user of the account contacts the issuing bank to inform them for some reason that the cardholder would like the charge removed from the account and the funds from the transaction returned to the account. A few potential examples for granting chargebacks may include incorrect transaction amount, duplicate billing, a previously canceled recurring payment being charged, services not being rendered, credit not being processed, and fraudulent transactions, just to name a few. Each time a user informs the issuing bank of a potential chargeback, the issuing bank must pay a fee to get the process started to determine which party will be left with the cost of the purchase of the item or services.

The embodiments described herein include a chargeback processing computing device, system, and method for building a chargeback prediction model that indicates the likelihood that a transaction will result in a chargeback. In some cases, payment processors are capable of providing scores to banks indicating how likely a transaction is fraudulent. However, there is currently no system capable of providing a score to banks and/or a merchant which indicates how likely a transaction is to result in a chargeback. The systems and methods described herein resolve this deficiency.

Each time a transaction is charged back, a payment processor of the transaction receives a record that explains why it was charged back as well as other features about the transaction. According to one or more example embodiments, the chargeback processing computing device may be in communication with the payment processor. The chargeback processing computing device may generate a chargeback prediction model that may consider chargeback information, for example, information about a specific transaction such as clearing data, information about a primary account number associated with a payment card including historical chargeback data of the primary account number, and the like, and generate a chargeback prediction model which may be used to predict the likelihood of future clearing transactions resulting in a chargeback.

Authorization, Clearing, and Chargeback Data Flow

Figure 1:
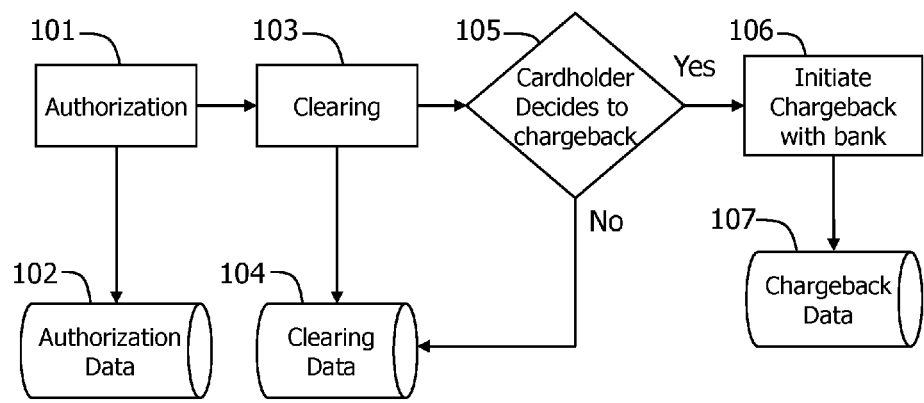
FIG. 1 is a data flow block diagram illustrating an example of chargeback information being generated by a payment processor in accordance with an example embodiment of the present disclosure.

FIG. 1 is a data flow block diagram illustrating an example of chargeback information being generated by a payment processor in accordance with an example embodiment of the present disclosure. Referring to FIG. 1, in 101 an account having a primary account number (PAN) and a payment card associated therewith is used to authorize a payment for goods or services from a merchant. The authorization information may include an initial payment amount, a merchant identification (ID), a location of the merchant, whether the payment card is present, and the like. The authorization information may be stored in an authorization database in 102.

When submitting a payment from an account associated with a payment card, the account payment transactions are authorized almost instantly so funds will be instantly pending for a transaction. However, it may take one to three business days, or more, for the transaction to clear the accountholder's bank or credit account. In 103, the funds clear otherwise referred to as clearing. The clearing information includes the same merchant ID as the authorization information. Accordingly, the payment processor is able to identify that the clearing information relates to the previous authorization information.

In addition, for example, the clearing information may also include one or more of a merchant country, merchant state, merchant city, merchant location ID, transaction amount, transaction currency, acquiring bank, acquiring country, issuing bank, issuing country, card product type, merchant category code, e-commerce indicator, contactless payment indicator, recurring transaction indicator, user presence indicator, cross border indicator, transaction date and time, and the like. This information may be stored in a clearing database, in 104. As a non-limiting example, the clearing information may at least include a transaction amount, a merchant category, an e-commerce indicator, a recurring transaction indicator, and a cross border indicator.

At this point, a user of the primary account number (PAN) has a period of time during which they may dispute the transaction and request a chargeback of the funds. As an example, the user may have 180 days from the date of the transaction to request a chargeback. In this example, if the user requests a chargeback in 105, a chargeback with the issuing bank is initiated in 106. If, however, the user does not request a chargeback within the allowed period of time, for example, within 180 days, the payment processor may infer that a chargeback did not occur. When a chargeback is initiated in 106, chargeback information is generated and stored in a chargeback database in 107. The chargeback database in 107 may store historical chargeback information associated with the primary account number. This information may be transmitted to another computing device, for example, the chargeback processing computing device described herein according to various example embodiments.

Although not shown in FIG. 1, the payment processor may also store account profile information about an account associated with a payment card. For example, the account profile information may include one or more of the total number of previous chargebacks on the account, previous chargeback count velocity, previous chargeback amount velocity, recurring transaction count velocity, transaction count velocity by merchant category, transaction amount velocity by merchant category, payment card present during transaction count velocity, payment card present during transaction amount velocity, payment card not present during transaction count velocity, payment card not present during transaction amount velocity, transaction decline count velocity, transaction decline amount velocity, user residential spending area, user travel count, fraud chargeback count, and the like.

As a non-limiting example, the account profile information or account profile data may at least include the previous chargeback count velocity, the previous chargeback amount velocity, a recurring transaction count, whether the payment card was present during transaction count velocity, whether the payment card was present during transaction amount velocity, and a fraud chargeback count.

Generating a Chargeback Prediction Model

According to one or more example embodiments, provided herein is a chargeback processing computing device, system, and method for generating a chargeback prediction model that indicates the likelihood that an account transaction will result in a chargeback. Each time a transaction is charged back, for example, as shown in 106 of FIG. 1, the payment processor of the transaction may receive a record that explains why the transaction was charged back as well as other features about the transaction.

According to one or more example embodiments, the chargeback processing computing device may communicate with the payment processor and obtain this information. For example, the chargeback processing computing device may generate a chargeback prediction model based on clearing information and account profile information received from the payment processor. According to various examples, the clearing information is specific to a particular use of the account whereas the account profile information is specific to the individual payment card or the primary account number (PAN) associated with the payment card.

According to various embodiments, the chargeback processing computing device may use information about a specific transaction such as clearing data, and information about a primary account number (PAN) including historical chargeback data, in combination, to determine the chargeback prediction model and a chargeback prediction score for a subsequent transaction made using the primary account number (PAN). With this information, the chargeback prediction model may be built and a chargeback risk score may be calculated for each new transaction that clears.

Figure 2:
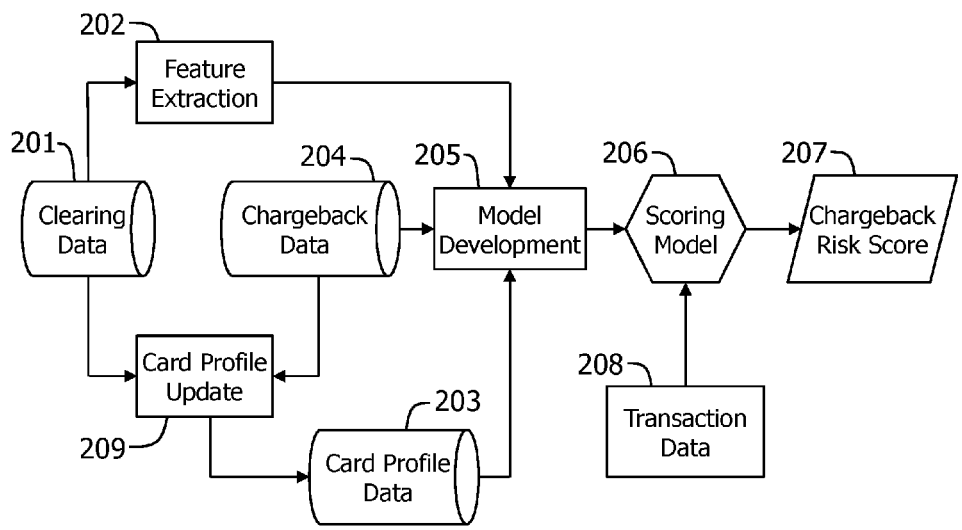
FIG. 2 is a data flow diagram illustrating an example of a chargeback prediction model being generated and used to estimate a chargeback risk score of a transaction according to an example embodiment of the present disclosure.

FIG. 2 is a data flow diagram illustrating an example of a chargeback prediction model being generated and used to estimate a chargeback risk score of a transaction according to an example embodiment.

Referring to FIG. 2, in 201 the chargeback processing computing device may receive clearing information from a payment processor. The clearing information may include data from, for example, a transaction that is performed using an account having a primary account number that is associated with a payment card. As an example, the clearing information may include some or all of the clearing information stored in the clearing database 104 in FIG. 1. Here, the clearing information may include information about a specific transaction.

In 202, feature extraction may be performed by the chargeback processing computing device. For example, the chargeback processing computing device may include a chargeback prediction module which is illustrated below. The chargeback prediction module may perform the feature extraction 202 from the clearing information 201. For example, one or more features from the clearing information 201 may include merchant country, merchant state, merchant city, merchant location ID, transaction amount, transaction currency, acquiring bank, acquiring country, issuing bank, issuing country, payment card product type, merchant category code, e-commerce indicator, contactless payment indicator, recurring transaction indicator, user presence indicator, cross border indicator, transaction date and time, and the like, which may be extracted by the chargeback prediction module.

In 203, the chargeback processing computing device may receive extracted account profile information from the payment processor. For example, the chargeback processing computing device may include an account profile extraction module that may receive and extract account profile data that may include data about a payment card or a primary account number associated with the payment card. For example, the account profile data may include prior chargeback historical data of the primary account number (PAN), one or more of the total number of previous chargebacks of the PAN, previous chargeback count velocity, previous chargeback amount velocity, recurring transaction count velocity, transaction count velocity by merchant category, transaction amount velocity by merchant category, whether the payment card was present during transaction count velocity, whether payment card was present during transaction amount velocity, whether payment card was not present during transaction count velocity, whether payment card was not present during transaction amount velocity, transaction decline count velocity, transaction decline amount velocity, user residential spending area, user travel count, fraud chargeback count, and the like, from the payment processor. As explained below in detail, the account profile data can be used to help determine a likelihood that a future transaction made using this PAN will result in a chargeback.

In addition, in 204, the chargeback processing computing device may also receive chargeback data. The chargeback data may include data indicating an item or services that were charged back, and data indicating an item or services that were not charged back. In some examples, the chargeback data may be included in the account profile data. By looking at both types of transactions in which a chargeback occurred and transactions in which a chargeback did not occur, it may be possible to more accurately determine which transactions are more likely to result in a chargeback request and which ones will not, and thus, more accurately create the chargeback prediction model.

According to various examples, the chargeback processing computing device may include the chargeback prediction module. Based on at least one of authorization information and clearing information, the chargeback prediction module may generate the chargeback prediction model in 205. For example, the chargeback prediction module may communicate with the payment processor. The generated chargeback prediction model may automatically score transactions in 206 to identify whether a transaction has a risk of resulting in a chargeback. A risk score generated in 206 may be used to indicate the probability that a transaction will result in a chargeback in 207.

In a first example, the transaction may be approved or denied at the time of authorization based on a calculated risk score. In this example, the risk score may be calculated in 207 based on authorization information included in the transaction data 208. Accordingly, a transaction can be denied "on the spot" at the time of purchase. In a second example, the transaction may be approved regardless. In this later example, a risk score may be calculated based on clearing information included in the transaction data 208 to indicate the likelihood that the cleared transaction will result in a chargeback in the future. Accordingly, the chargeback prediction model may generate a chargeback risk score for the clearing transaction in 207, and transmit the chargeback risk score to at least one of the payment processor, the issuing bank, the acquiring bank, and the like. In this later case, the chargeback risk score may be used to predict how many potential chargeback transactions of an issuing bank, or other entity, have cleared, thus, giving the bank an idea of an amount of money that might be necessary to cover the possible chargebacks.

In some examples, the subsequent clearing transaction information generated in 208 may be used to update the account profile information in 209 and applied to the account profile information in 203. For example, the account profile information may be updated daily, weekly, bi-weekly, monthly, and the like, with clearing transaction information generated during that time period.

Example of a Chargeback Processing Computing Device

Figure 3:
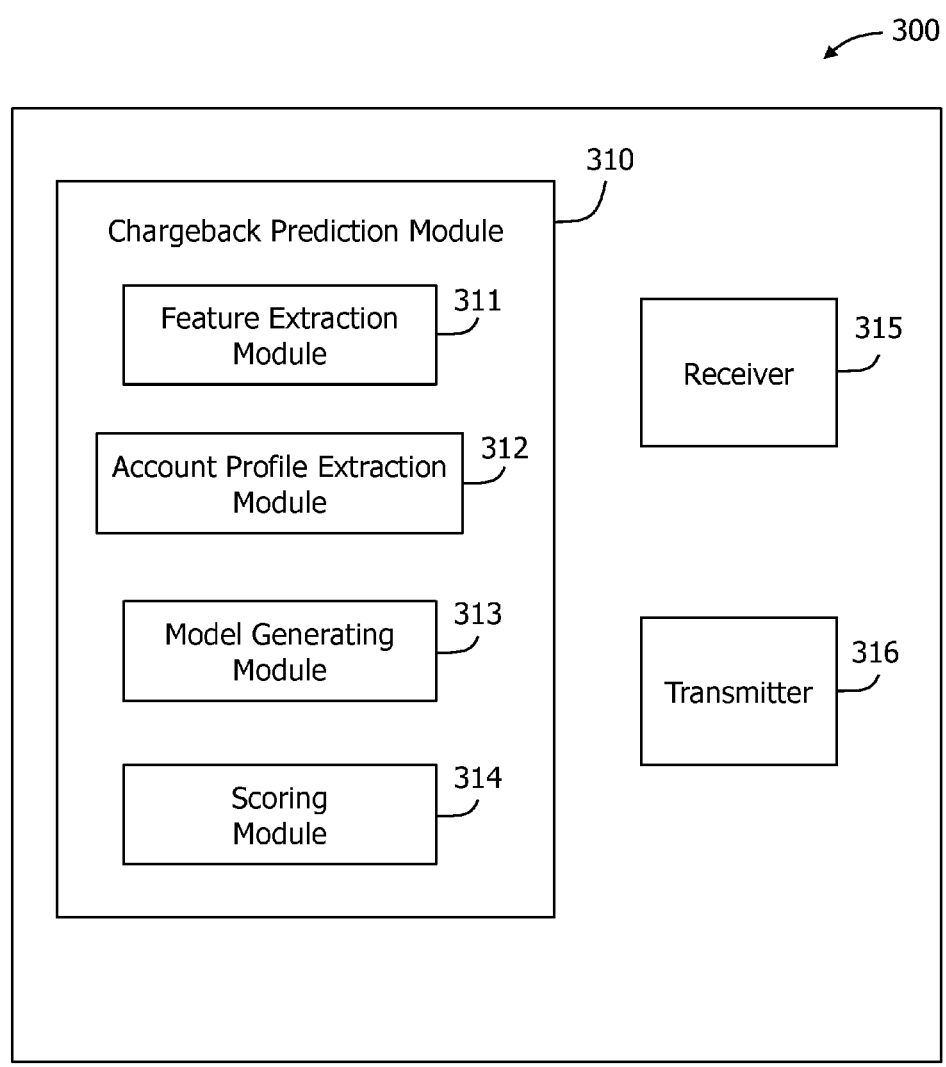
FIG. 3 is a block diagram illustrating an example of a chargeback processing computing device having the chargeback prediction model shown in FIG. 2.

FIG. 3 is a block diagram depicting an example of a chargeback processing computing device having the chargeback prediction model that is shown in FIG. 2.

Referring to FIG. 3, for example, the chargeback processing computing device 300 may be part of a payment processor or may be in communication with a payment processor. Also, the chargeback processing computing device may communicate with an issuing bank, an acquiring bank, a merchant, and the like. The chargeback processing computing device 300 may include a chargeback prediction module 310. Based on transaction data and account profile data, the chargeback prediction module 310 may generate a chargeback prediction model. The generated chargeback prediction model may automatically score the chargeback risk of future clearing transactions. The score may be used to indicate the probability that a transaction will result in a chargeback in the future and ultimately cause an additional use of resources and time by banks and payment processors.

According to one or more examples, the chargeback prediction module 310 may perform feature extraction from a particular transaction and from historical data of an account associated with a payment card which are collected and received by the payment processor. The chargeback prediction module 310 may also be used to generate the chargeback prediction model based on the extracted features. For example, the chargeback prediction module 310 may generate a transaction feature extraction component which extracts the aforementioned factors from single transactions, and transforms them into numeric or categorical features. The chargeback prediction module 310 may include one or more processing devices. Also, the chargeback prediction module 310 may include a single core processor, a multicore processor, and the like. The chargeback prediction module 310 may also include or be in communication with a memory device. For example, data stored in the memory device may be processed by the processor of the chargeback prediction module 310.

In some examples, the chargeback prediction module 310 may include a plurality of modules. For example, the chargeback prediction module may include a feature extraction module 311, an account profile extraction module 312, a model generating module 313, a scoring module 314, and the like. The feature extraction module 311 may extract clearing data from a transaction or a plurality of transactions. The account profile extraction module 312 may extract information about an account used to pay for the transaction or the plurality of transactions from the payment processor, the model generating module 313 may generate the chargeback prediction model, and the scoring module 314 may be used to score the probability that a new transaction will result in a chargeback. In this example, any of the feature extraction module 311, account profile extraction module 312, model generating module 313, and the scoring module 314 may be controlled by or replaced by a processing device.

In addition, the chargeback processing computing device 300 may further include a receiver 315 that receives a subsequent transaction from the account or the primary account number (PAN) associated with the account. The subsequent transaction may be referred to as a candidate transaction. The chargeback processing computing device 300 may generate a chargeback prediction score indicating a likelihood that the candidate transaction will result in a chargeback. Also, the chargeback processing computing device 300 may include a transmitter 316 that may transmit the chargeback prediction score generated by the scoring module 314 to another device, for example, a device corresponding to a payment processor, an issuing bank, an acquiring bank, and the like. For example, the transmitter 316 may transmit a chargeback prediction score as well as a recommendation whether to decline or accept the transaction that is paid for using the account. As an example, the transmitter 316 may transmit the recommendation to at least one of the issuing bank (i.e., of the account) or the acquiring bank (i.e., of the merchant).

In addition, the account profile data that includes variables calculated based on the transaction history of an account may be updated periodically. In some examples, to avoid duplicating efforts, some of the variables of the account profile data may be taken from a fraud scoring model including variables calculated for fraud scoring. After combining each of the features, the chargeback prediction module 310 may generate a comprehensive feature vector for each historical clearing transaction. Along with the historical chargeback information, the chargeback prediction model may be generated using regularized logistic regression, to predict the probability of a clearing transaction turning into chargeback.

In addition, the model may help identify the features or variables that are more relevant to calculating the risk score so that the model can be improved and made more efficient. In the process of building the chargeback prediction model, the aforementioned factors may be analyzed and their contribution toward the accuracy of the chargeback prediction model may be investigated. As a result of the investigation, some features may be determined to generate a more accurate prediction of a chargeback while some features may contribute little to the prediction accuracy, or even make the chargeback prediction score less accurate. In this example, features that improve an accuracy of the chargeback prediction model may be identified while negligible features that hinder accuracy may be removed to improve the efficiency of the model. Accordingly, improving features may be identified and given more weight and negligible features may be removed and given little or no weight in order to improve the efficiency of the chargeback prediction model.

Chargebacks can occur for a number of different reasons, including fraud. But it should be appreciated that the examples herein are not just predicting potential fraudulent charges that become chargebacks, rather the examples may predict the likelihood of a transaction being a chargeback for other reasons as well. For example, a legitimate user of an account may authorize a legitimate purchase. However, the chargeback prediction model may indicate that the particular merchant with whom the purchase has been made has a poor performance record with consumers which might likely lead to a chargeback. In this example, the primary account number (PAN) associated with a card is not a chargeback risk but rather the merchant themselves are the risk because they often fail to adequately deliver on their goods or services. In this example, the chargeback processing computing device 300 may generate the chargeback risk score based on the poor merchant prior performance, thus resulting in a chargeback prediction score that indicate a likely chargeback occurrence.

As another example, the primary account number (PAN) might be used to make a legitimate purchase at a merchant, but the PAN may have a significant history of submitting a chargeback request for the merchant or merchant category code involved in transaction. For example, an account may have a significant history of requesting a chargeback on purchases at a particular merchant or merchant category. Therefore, in an example in which the account is used to purchase shoes, the chargeback prediction model may indicate that a chargeback request is likely based on the previous merchant-related purchase chargebacks and the chargeback processing computing device 300 may use this information to generate a chargeback risk score indicating a high likelihood of a chargeback.

When a new clearing transaction comes through or when a new transaction is being authorized, the feature extraction module 311 of the chargeback prediction module 310 may be applied, and the extracted features from the transaction may be combined with variables in the account profile information. After that a chargeback risk score may be calculated using the chargeback prediction model that is built based on historical account information. This score may provide a percentage likelihood of a similar clearing transaction (i.e. a purchase of similar goods or services) turning into a chargeback.

Sequence Diagram Between Device and Payment Processor

Figure 4:
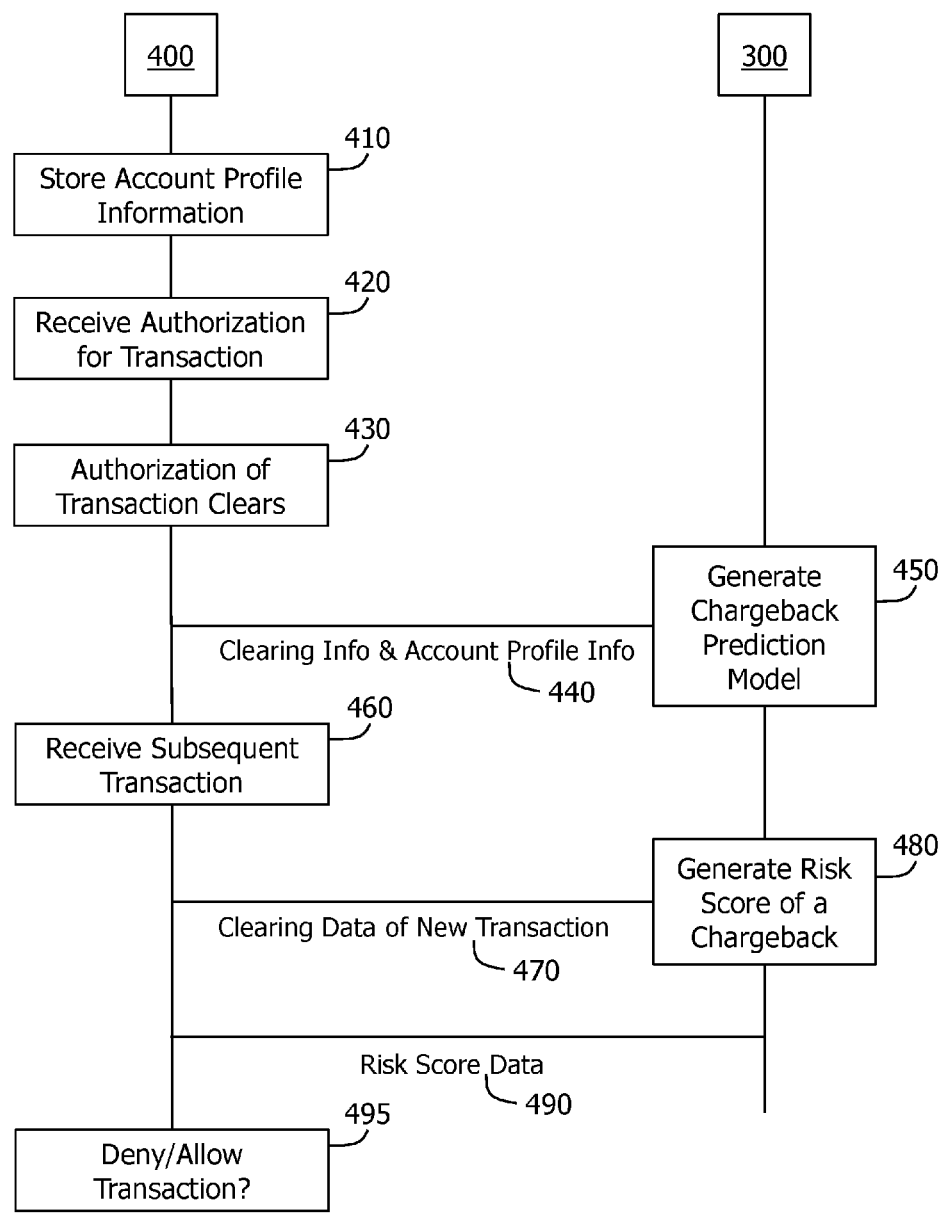
FIG. 4 is a sequence diagram illustrating an example of a sequence of communication between the chargeback processing computing device (shown in FIG. 3) and a payment processor, according to an example embodiment of the present disclosure.

FIG. 4 is a sequence diagram illustrating an example of a sequence of communication between the chargeback processing computing device (shown in FIG. 3) and a payment processor, according to an example embodiment of the present disclosure. Although the chargeback processing computing device 300 is separately illustrated from the payment processor 400 in this example for convenience of description, it should be appreciated that in some examples the two components may be combined or coupled together as one.

Referring to FIG. 4, in 410, the payment processor 400 stores account profile information. The account profile information may include prior chargeback historical data of an account or account number associated with a payment card which may include one or more of the total number of previous chargebacks on the account, previous chargeback count velocity, previous chargeback amount velocity, recurring transaction count velocity, transaction count velocity by merchant category, transaction amount velocity by merchant category, whether the payment card was present during transaction count velocity, whether the payment card was present during transaction amount velocity, whether the payment card was not present during transaction count velocity, whether the payment card was not present during transaction amount velocity, transaction decline count velocity, transaction decline amount velocity, user residential spending area, user travel count, fraud chargeback count, and the like.

In 420, the payment processor 400 receives an authorization for payment of a transaction using the account. The transaction may include authorization for the purchase of goods or services from a merchant, and the authorization of the transaction clears in 430. In 440, the payment processor 400 transmits clearing information and account profile information about the account to the chargeback processing computing device 300. In 450, the chargeback processing computing device 300 generates a chargeback prediction model based on the clearing information and the account profile information, which may be used to predict the likelihood of a future transaction resulting in a chargeback.

In 460, the payment processor 400 receives transaction data including an authorization record or a clearing record of the transaction. Accordingly, the payment processor 400 transmits information about the authorization or the clearing to the chargeback processing computing device 300, in 470. In 480, the chargeback processing computing device 300 generates a chargeback risk score indicating the likelihood that the transaction data received in 460 will result in a chargeback on a respective transaction. In 490, the chargeback risk score is transmitted to the payment processor 400.

Accordingly, in 495 the payment processor may determine whether to accept or deny a transaction when the transaction data includes an authorization record. In this example, the payment processor may determine whether to accept or deny a transaction "on the spot." transmitted to a bank, for example, an issuing bank and/or an acquiring bank and may be used by the bank to allow or deny the transaction. In addition to the chargeback risk score, the chargeback processing computing device 300 may also transmit a recommendation as to whether the authorized charge should be allowed or declined.

Although not shown in FIG. 4, in another example, the chargeback risk score may instead be used in a report such as a weekly, monthly, quarterly, or yearly report for issuing or acquiring banks, where the total transaction amount with chargeback risk can be calculated. Such a report may assist banks in their financial planning as well as risk assessments.

Time at which the Transaction May be Scored

According to various examples, the chargeback system and method have the ability to score a transaction on the spot as well as in the future in a batch process, and provide this information to the issuing bank and/or the acquiring bank. That is, the system and method may be used to make a recommendation on a transaction in real time, or the chargeback data could be more of a latent process in which a historical chargeback data on the transaction is made available to banks at a later point in time, for example, 24 hours later, a few days later, weeks later, a month later, and the like. These are two different example use cases.

For example, scoring on the spot can assist banks in making real time authorization decisions but also may potentially cause a delay in the overall approval processing of a transaction. On the other hand, scoring afterward as a batch process may help banks estimate the total number of chargeback risks that they currently have without imposing delays during the transaction approval process, but at this stage the bank may not be able to reverse their decision on the transaction. In other words, the transaction will be accepted regardless. In this case, the risk score for each transaction, and/or the aggregated risk measure (e.g., the number of transactions with a risk score higher than a threshold, or sum of transaction dollar amount at risk) may be provided to issuing/acquiring banks.

In some examples, when a user uses an account number associated with a payment card, a profile of that account may be matched with the historic set of transactions or historic chargeback information of the account included in the chargeback prediction model. In some examples, a chargeback prediction score may be generated in real time thereby allowing the payment processor to score the transaction and provide this score to at least one of the issuing bank and the acquiring bank of the transaction almost immediately. As another example, the generation of a chargeback prediction score may be more of a latent process in which a determination is made hours or even a few days after the account is used to authorize payment of a transaction. For example, the chargeback prediction score may be delivered to the Account Management System (AMS) of a payment processor, where it may be scored in a data warehouse and given to the AMS at the end of the day or at the end of the week or at the end of the month, for example, if it is going to be for historical reporting to one or more banks. The predictive score can subsequently be sent in a batch with other potential chargebacks to the banks.

When a user of a primary account number goes to a store or makes a purchase online using their account, this is the account's authorization for payment of the goods or services. Typically though, it takes 24 hours to 3 days for the clearing transaction to occur. During clearing the funds actually get cleared back and forth. In various examples described herein, when clearing data is loaded into the data warehouse, the chargeback prediction score may be generated. The chargeback prediction score may then be sold to the issuing bank and/or the acquiring bank because the chargeback is typically not going to happen 3 days after you make a purchase. Rather, for example, it may happen when a user of the primary account number looks at their statement (for example, 30 days later) and realizes they don't recognize a charge, or a charge does not seem correct. Accordingly, a bank may have a better idea of their liability on potential chargebacks for transactions that have occurred over certain time period, for example, 30 days, 60 days, 90 days, 180 days, and the like.

Example of Method of Predicting a Chargeback

Figure 5:
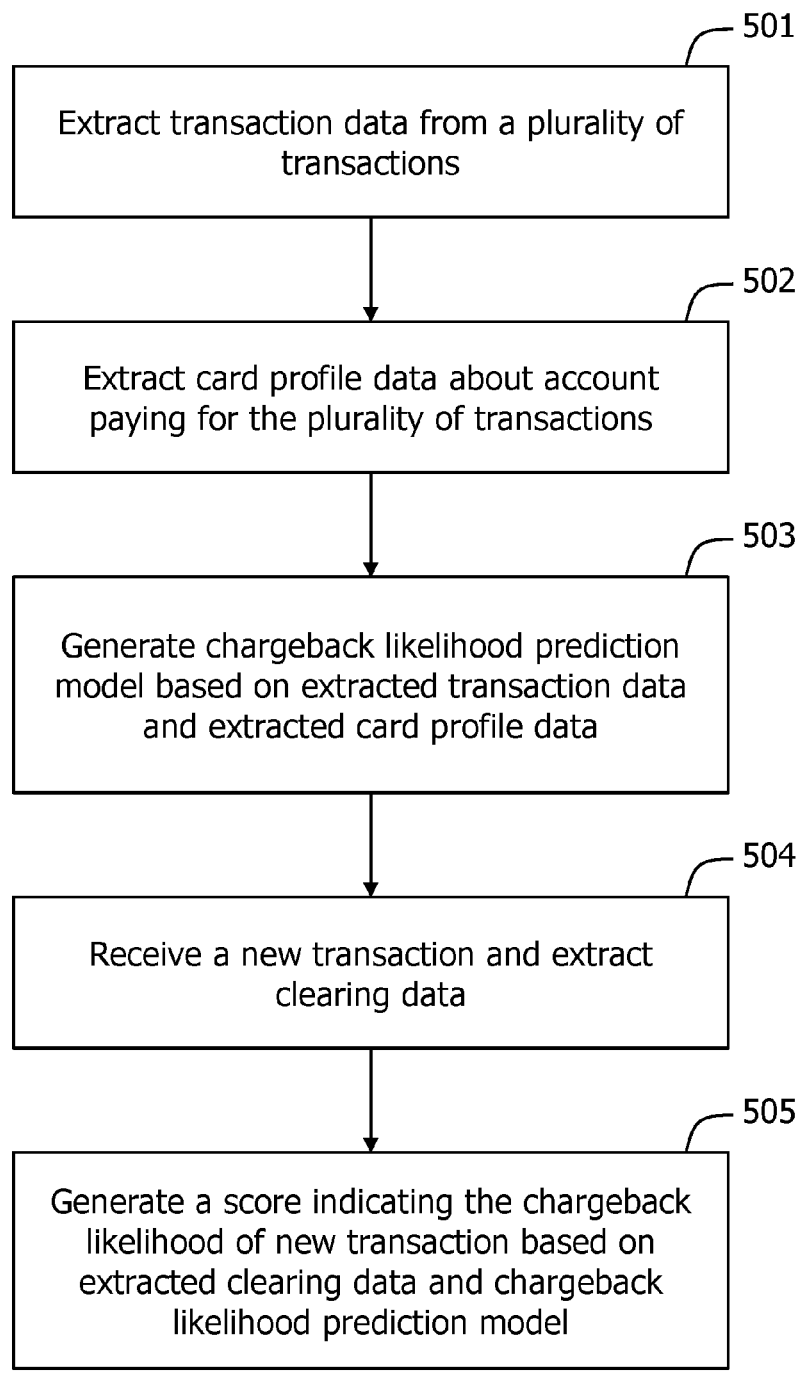
FIG. 5 is a diagram illustrating an example of a computer-implemented method for predicting the likelihood that a transaction will result in a chargeback according to an example embodiment of the disclosure.

FIG. 5 is a diagram illustrating an example of a computer-implemented method for predicting the likelihood that a transaction will result in a chargeback according to an example embodiment of the disclosure.

Referring to FIG. 5, in 501, the method includes extracting transaction information from a plurality of transactions that are paid for using an account. The transaction information may be extracted from clearing information of each transaction that is stored by a payment processor. For example, the extracted clearing information may include one or more of merchant country, merchant state, merchant city, merchant location 11D, transaction amount, transaction currency, acquiring bank, acquiring country, issuing bank, issuing country, payment card product type, merchant category code, e-commerce indicator, contactless payment indicator, recurring transaction indicator, user presence indicator, cross border indicator, transaction date and time, and the like.

In 502, the method further extracts account profile information about an account number or a payment card associated with the account number authorizing payment of the plurality of transactions. For example, the extracted account profile information may include chargeback historical data of a primary account number (PAN) of the account stored by the payment processor and which may be used to help determine the likelihood that a future transaction authorized by the PAN will turn into a chargeback. For example, the extracted account profile information may include one or more of the total number of previous chargebacks on the account, previous chargeback count velocity, previous chargeback amount velocity, recurring transaction count velocity, transaction count velocity by merchant category, transaction amount velocity by merchant category, whether the payment card was present during transaction count velocity, whether the payment card was present during transaction amount velocity, whether the payment card was not present during transaction count velocity, whether the payment card was not present during transaction amount velocity, transaction decline count velocity, transaction decline amount velocity, user residential spending area, user travel count, fraud chargeback count, and the like.

In 503, the method includes generating a chargeback prediction model based on the extracted transaction clearing information and the extracted account profile information. The chargeback prediction model may be used to predict the likelihood that a future transaction paid for using the primary account number (PAN) will result in a chargeback request.

In 504, the method includes receiving a new transaction authorized using the primary account number. In response to the transaction generating clearing information, the method further includes extracting the clearing information of the newly received transaction. In 505, the method generates a chargeback prediction score based on the extracted clearing information of the newly received transaction extracted in 504 and the chargeback prediction model generated in 503. The chargeback prediction score may indicate the likelihood that the newly received transaction will generate a chargeback.

Although not shown, the method may further include updating the chargeback prediction model with information about the newly received transaction extracted in 504. For example, the updating the chargeback prediction model may occur once every few days, once a week, once every two weeks, once a month, and the like.

According to various examples, a chargeback prediction model may be built based on a plurality of transactions authorized using a payment card or a primary account number (PAN) associated with the payment card. Accordingly, future transactions may be scored based on the chargeback prediction model and given a chargeback prediction score. For example, a potential chargeback transaction may be identified and stored, terminated in real time, and the like, if it is determined that such transaction will likely result in a chargeback. In some examples, the transaction may be terminated by the issuing bank, the acquiring bank, and the like. In addition, information about a particular transaction such as the clearing data along with historical chargeback information about an account may be used to determine the likelihood that a transaction authorized using the account will likely result in a chargeback.

In some embodiments, the chargeback prediction model may be continually updated or refreshed based on subsequent transactions. For example, in addition to generating a chargeback prediction score for a transaction, the information from the transaction may also be used to update the chargeback prediction model. Accordingly, the chargeback prediction model may be dynamically updated and refreshed based on the most recent clearance information and chargeback information of a primary account number associated with an account. For example, the chargeback prediction model may be updated or refreshed every week, bi-week, month, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed examples of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

Additional Considerations

The computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, and/or computers. Each type of transactions card can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

For example, one or more computer-readable storage media may include computer-executable instructions embodied thereon for determining the likelihood of an authorized transaction resulting in a chargeback. In this example, the computing device may include a memory device and a processor in communication with the memory device, and when executed by said processor the computer-executable instructions may cause the processor to perform a method such as the method described and illustrated in the example of FIG. 5.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example, the system is executed on a single computer system, without a connection to a server computer. In a further example, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional examples that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A chargeback processing computing device for determining the likelihood of a chargeback, the chargeback processing computing device comprising:
   a chargeback prediction module configured to extract transaction information about a plurality of transactions authorized by an account, the transaction information comprising at least one of authorization data and clearing data of each of the plurality of transactions;
   an account profile information module configured to extract account profile information about the account authorizing the plurality of transactions, the account profile information comprising historical chargeback information about the plurality of transactions authorized using the account;
   a model generating module configured to generate a chargeback prediction model for the account based on the extracted transaction information and the account profile information of the plurality of transactions;
   a receiver configured to receive a candidate transaction paid for by the account, wherein the chargeback prediction module is further configured to extract transaction information from the candidate transaction; and
   a processor configured to:
      analyze merchant prior performance information associated with a merchant identified in the candidate transaction to determine a chargeback risk associated with the merchant;
      generate a chargeback prediction score indicating a likelihood that the candidate transaction will result in a chargeback based on the analyzed merchant prior performance information, the extracted transaction information for the candidate transaction, and the generated chargeback prediction model, wherein the chargeback prediction score indicates a likelihood that a cardholder for the candidate transaction will request a return of funds provided during the candidate transaction;
      determine, based on the chargeback prediction score, that the candidate transaction is likely to result in a chargeback; and
      based on the determination that the candidate transaction is likely to result in a chargeback, cause the transaction to be denied in real time at the time of authorization, thereby conserving computational resources and reducing processing time that would otherwise be used for processing the chargeback.

2. The chargeback processing computing device of claim 1, wherein the extracted transaction information about the plurality of transactions comprises at least one of merchant country, merchant state, merchant city, merchant location id, transaction amount, transaction currency, acquiring bank, acquiring country, issuing bank, issuing country, payment card product type, merchant category code, e-commerce indicator, contactless payment indicator, recurring transaction indicator, user presence indicator, cross border indicator, and transaction date and time.

3. The chargeback processing computing device of claim 1, wherein the extracted account profile information about the account comprises at least one of a total number of previous chargebacks on the account, previous chargeback count velocity, previous chargeback amount velocity, recurring transaction count velocity, transaction count velocity by merchant category, transaction amount velocity by merchant category, payment card present during transaction count velocity, payment card present during transaction amount velocity, payment card not present during transaction count velocity, payment card not present during transaction amount velocity, transaction decline count velocity, transaction decline amount velocity, user residential spending area, user travel count, and fraud chargeback count.

4. The chargeback processing computing device of claim 1, wherein the model generating module is further configured to dynamically adjust the chargeback prediction model to provide more weight to at least one type of data from among the transaction information of the plurality of transactions or the account profile information that is determined to provide more accuracy to the chargeback prediction model.

5. The chargeback processing computing device of claim 1, wherein, in response to the amount of time from the occurrence of the candidate transaction exceeding a predetermined amount of time, the processor is further configured to adjust the chargeback prediction score for the candidate transaction to indicate that it is less likely that the candidate transaction will result in a chargeback.

6. The chargeback processing computing device of claim 1, wherein the model generating module is configured to refresh the chargeback prediction model based on subsequent transactions that are authorized using the account.

7. A computer-implemented method for determining the likelihood of a transaction resulting in a chargeback using a computing device coupled to a payment processing device, the method comprising:
   extracting transaction information about a plurality of transactions authorized by an account, the transaction information comprising at least one of authorization data and clearing data of each of the plurality of transactions;
   extracting account profile information about the account used to authorize the plurality of transactions, the account profile information comprising historical chargeback information about the plurality of transactions authorized using the account;
   generating a chargeback prediction model for the account based on the extracted transaction information and the account profile information of the plurality of transactions;
   receiving a candidate transaction paid for using the account and extracting transaction information from the candidate transaction;
   analyzing merchant prior performance information associated with a merchant identified in the candidate transaction to determine a chargeback risk associated with the merchant;
   generating a chargeback prediction score indicating a likelihood that the candidate transaction will result in a chargeback based on the analyzed merchant prior performance information, the extracted transaction information for the candidate transaction and the generated chargeback prediction model, wherein the chargeback prediction score indicates a likelihood that a cardholder for the candidate transaction will request a return of funds provided during the candidate transaction;
   determining, based on the chargeback prediction score, that the candidate transaction is likely to result in a chargeback; and
   based on the determination that the candidate transaction is likely to result in a chargeback, causing the transaction to be denied in real time at the time of authorization, thereby conserving computational resources and reducing processing time that would otherwise be used for processing the chargeback.

8. The computer-implemented method of claim 7, wherein the extracting the transaction information about the plurality of transactions comprises extracting at least one of merchant country, merchant state, merchant city, merchant location id, transaction amount, transaction currency, acquiring bank, acquiring country, issuing bank, issuing country, payment card product type, merchant category code, e-commerce indicator, contactless payment indicator, recurring transaction indicator, user presence indicator, cross border indicator, and transaction date and time.

9. The computer-implemented method of claim 7, wherein the extracting the account profile information about the account comprises extracting at least one of a total number of previous chargebacks on the account, previous chargeback count velocity, previous chargeback amount velocity, recurring transaction count velocity, transaction count velocity by merchant category, transaction amount velocity by merchant category, payment card present during transaction count velocity, payment card present during transaction amount velocity, payment card not present during transaction count velocity, payment card not present during transaction amount velocity, transaction decline count velocity, transaction decline amount velocity, user residential spending area, user travel count, and fraud chargeback count.

10. The computer-implemented method of claim 7, wherein the generating of the chargeback prediction model comprises dynamically adjusting the chargeback prediction model to provide more weight to at least one type of data from among the transaction information or the account profile information that is determined to provide more accuracy to the chargeback prediction model.

11. The computer-implemented method of claim 7, wherein, in response to the amount of time from the receiving of the candidate transaction exceeding a predetermined amount of time, the generating of the chargeback prediction score comprises adjusting the chargeback prediction score to indicate that it is less likely that the candidate transaction will result in a chargeback.

12. The computer-implemented method of claim 7, wherein the method further comprises continually refreshing the chargeback prediction model based on each subsequent transaction that is received.

13. One or more non-transitory computer-readable storage media having computer-executable instructions embodied thereon for determining a likelihood of a transaction resulting in a chargeback, wherein the computing device includes a memory device and a processor in communication with the memory device, and wherein when executed by said processor, the computer-executable instructions cause said processor to:

extract transaction information about a plurality of transactions authorized using an account, the transaction information comprising at least one of authorization data and clearing data of each of the plurality of transactions;

extract account profile information about the account used to authorize the plurality of transactions, the account profile information comprising historical chargeback information about the plurality of transactions authorized using the account;

generate a chargeback prediction model for the account based on the extracted transaction information and the account profile information of the plurality of transactions;

receive a candidate transaction paid for using the account and extracting transaction information from the candidate transaction;

analyze merchant prior performance information associated with a merchant identified in the candidate transaction to determine a chargeback risk associated with the merchant;

generate a chargeback prediction score indicating a likelihood that the candidate transaction will result in a chargeback based on the extracted transaction information for the candidate transaction and the generated chargeback prediction model, wherein the chargeback prediction score indicates a likelihood that a cardholder for the candidate transaction will request a return of funds provided during the candidate transaction;

determine, based on the chargeback prediction score, that the candidate transaction is likely to result in a chargeback; and based on the determination that the candidate transaction is likely to result in a chargeback, cause the transaction to be denied in real time at the time of authorization, thereby conserving computational resources and reducing processing time that would otherwise be used for processing the chargeback.

14. The non-transitory computer-readable storage media of claim 13, wherein the computer-executable instructions cause said processor to extract transaction information about the plurality of transactions comprising at least one of merchant country, merchant state, merchant city, merchant location id, transaction amount, transaction currency, acquiring bank, acquiring country, issuing bank, issuing country, payment card product type, merchant category code, e-commerce indicator, contactless payment indicator, recurring transaction indicator, user presence indicator, cross border indicator, and transaction date and time.

15. The non-transitory computer-readable storage media of claim 13, wherein the computer-executable instructions cause said processor to extract account profile information about the account comprising at least one of a total number of previous chargebacks on the account, previous chargeback count velocity, previous chargeback amount velocity, recurring transaction count velocity, transaction count velocity by merchant category, transaction amount velocity by merchant category, payment card present during transaction count velocity, payment card present during transaction amount velocity, payment card not present during transaction count velocity, payment card not present during transaction amount velocity, transaction decline count velocity, transaction decline amount velocity, user residential spending area, user travel count, and fraud chargeback count.

16. The non-transitory computer-readable storage media of claim 13, wherein the computer-executable instructions cause said processor to dynamically adjust the chargeback prediction model to provide more weight to at least one type of data from among the transaction information or the account profile information that is determined to provide more accuracy to the chargeback prediction model.

17. The non-transitory computer-readable storage media of claim 13, wherein the computer-executable instructions cause said processor to, in response to the amount of time from the occurrence of the candidate transaction exceeding a predetermined amount of time, adjust the chargeback prediction score to indicate that it is less likely that the candidate transaction will result in a chargeback.

18. The non-transitory computer-readable storage media of claim 13, wherein the computer-executable instructions cause said processor to continually refresh the chargeback prediction model based on each subsequent transaction authorized by the account that is received.

* * * * *